(12) United States Patent
Chennamadhavuni

(10) Patent No.: US 8,949,330 B2
(45) Date of Patent: Feb. 3, 2015

(54) SYSTEMS AND METHODS FOR AUTOMATED RECOMMENDATIONS FOR SOCIAL MEDIA

(76) Inventor: Venkata Ramana Chennamadhavuni, Mumbai (IN)

( * ) Notice: Subject to any disclaimer, the term of this patent is extended or adjusted under 35 U.S.C. 154(b) by 0 days.

(21) Appl. No.: 13/280,424

(22) Filed: Oct. 25, 2011

(65) Prior Publication Data

US 2013/0054693 A1     Feb. 28, 2013

(30) Foreign Application Priority Data

Aug. 24, 2011   (IN) .................................. 2372/2011

(51) Int. Cl.
 G06F 15/16   (2006.01)
 G06Q 10/10   (2012.01)
(52) U.S. Cl.
 CPC ...................................... G06Q 10/10 (2013.01)
 USPC ....................................... 709/204; 705/14.53
(58) Field of Classification Search
 None
 See application file for complete search history.

(56) References Cited

U.S. PATENT DOCUMENTS

| | | | | |
|---|---|---|---|---|
| 7,143,135 | B2 * | 11/2006 | Smith et al. | 709/204 |
| 2008/0294624 | A1 * | 11/2008 | Kanigsberg et al. | 707/5 |
| 2009/0112839 | A1 * | 4/2009 | Fisher et al. | 707/5 |
| 2009/0164897 | A1 * | 6/2009 | Amer-Yahia et al. | 715/703 |
| 2010/0119053 | A1 * | 5/2010 | Goeldi | 379/265.09 |
| 2011/0035211 | A1 * | 2/2011 | Eden | 704/10 |
| 2011/0153423 | A1 * | 6/2011 | Elvekrog et al. | 705/14.53 |
| 2011/0282943 | A1 * | 11/2011 | Anderson et al. | 709/204 |
| 2012/0036015 | A1 * | 2/2012 | Sheikh | 705/14.54 |
| 2012/0101806 | A1 * | 4/2012 | Davis et al. | 704/9 |

* cited by examiner

*Primary Examiner* — Jason K. Gee
*Assistant Examiner* — Maung Lwin
(74) *Attorney, Agent, or Firm* — Timberline Patent Law Group PLLC

(57) ABSTRACT

A system for automated recommendations for social media activities includes a page data extraction module for extracting pre-defined page data parameters in relation to pre-defined reference parameters; a reference module for providing reference parameters in relation to each of the pre-defined page data; a comparing and correlation module for comparing and correlating each of the extracted page data parameters with each of the corresponding reference parameters to obtain a corresponding comparative and correlative score for each of the parameters; and a recommendation module for recommending action points based on each of the comparative and correlative scores for each of the parameters.

23 Claims, 7 Drawing Sheets

| R1 | R2 | R3 |
|---|---|---|
| R4 | R5 | R6 |
| R7 | R8 | R9 |

SYSTEMS AND METHODS FOR AUTOMATED RECOMMENDATIONS FOR SOCIAL MEDIA

FIELD OF THE INVENTION

This invention relates to the field of computational systems and information systems. Particularly, the present invention relates to the field of network based social media activities. More particularly, this invention relates to systems and methods for automated recommendations for social media activities.

BACKGROUND OF THE INVENTION

In the present age, networks of computing devices, for example internet, have become a popular and important medium for carrying out various day-to-day activities. These activities include the use of network based social media for people to people interaction, online marketing, advertisements, entertainment, blogs, tweets and file sharing etc. Any medium that involves interaction between two or more network users and allow such activities have now started to come under the classification of social media, and it is increasingly becoming more popular, organized and effective with time. The common elements of social media would include, but is not limited to, social networks, chatting tools and forums, messaging services, web logs, personal pages, user review sites, deal aggregators, gaming consoles, discussion forums, file sharing interfaces, online magazines, online surveys and blogs etc. These elements are now being used widely by users to maximize their visibility, draw feedback, research product and marketing ideas, reach potential customers, address existing customers and resolve issues.

One of the key components emerging out of network based social media is the data analytics of various social media activity data and metadata recorded, processed and categorized which is made available in respect of the various interactions made in social media and associated metadata. The said social media activity data and metadata could be at an individual user level or multiple user level or group level. There are certain diagnostic tools available which use social media activity data to generate analytics output such as reports, trends, patterns, frequency charts etc. which are used for analysing and understanding the performance of a social media element. These are normally used by businesses or individuals in understanding the user behaviour, perception, interest and feedback, which is further by way of manual interpretation used to derive actionable points to increase or improve the quality and quantity of interaction with users or prospective users of the social media element. The correct and effective interpretation of the analytics output is significant to the success of social media elements and needs to be done in a systematic and logical manner, for which effective systems and methods are required. In the current state of art, there are no effective systems or methods which use the analytics output and interpret them to derive actionable points to increase or improve the quality and quantity of social media interaction. The interpretation which is often done by humans could be erroneous, incomplete, unreasonable and limited, and if the same can be done by an automated mechanism comprising predefined algorithms, parameters and formula, then such interpretation is likely to be far more accurate and effective.

Another drawback of the current practices in interpretation methods of social media analytics is that while such interpretation and consequent actionable points are deduced, certain related factors which are not directly forming a part of the analytics data and metadata are not considered and thus can lead to less effective and logical actionable points. Examples of such factors include industry dynamics, socio-political factors, seasonal patterns etc.

In terms of social media elements and platforms, dedicated pages, sites, tools, applications, interfaces, or the like, can be established for leveraging a business in terms of internet presence and related advertisements. But there is no system in the prior art which recommends a user or a page owner to modify content in order to increase effectiveness of its social media presence in order to provide better a user-visitor engagement quotient.

The present invention in its various embodiments, aims to address the above drawbacks and requirements, and provide effective systems and methods for providing effective interpretation and actionable points in the form of automated recommendations for social media activity.

OBJECTS OF THE INVENTION

An object of the invention is to provide actionable points for acting in quick time on the shortcomings of social media presence by means of a social media page.

Another object of the invention is to improve effectiveness of social media activities for a page owner.

Yet another object of the invention is to increasing visibility of a page of a social media networking site or platform.

Still another object of the invention is to improve probability of engaging with visitors for a page owner of a social media networking site or platform.

An additional object of the invention is to improve stickiness in relation to visitors and page owner of a social media networking site or platform.

Yet an additional object of the invention is to provide recommendations for a page of a social media networking site or platform in relation to user-visitor engagement.

Still an additional object of the invention is to provide weighted recommendations for a page of a social media networking site or platform in relation to user-visitor engagement.

DESCRIPTION OF THE INVENTION

For the purposes of this specification, the term, 'page' is any page, interface, profile, application, tool, or component on a social media networking site which is created in respect of a specific product or service or business or interest or profile or a personality or a community or a group. The target of this page is to obtain social media presence and use it as a platform for awareness, business, or interacting with current and future users of the product or service or business or interest.

For the purposes of this specification, the term, 'data' is meant to include all forms of data, text, image, audio, hyperlink, video and metadata.

For the purposes of this specification, the term, 'activity' is meant to include any kind of action on a page. According to a non-limiting exemplary embodiment, on a page hosted by Facebook, activities may include the action of updating a status message, commenting on a status message, uploading and sharing a photo, uploading and sharing a link, and the like. According to another non-limiting exemplary embodiment, on a page hosted by Twitter, activities may include the action of tweeting or re-tweeting in relation to the page or in relation to users tweets on or about the page, and the like. According to yet another non-limiting exemplary embodiment, on a page hosted by Linkedin, activities may include the action of starting a discussion thread, commenting on a discussion thread, and the like. The types of 'activities', for each social networking platform, are pre-defined and pre-populated into the system of this invention.

For the purposes of this specification, the term, 'user' is meant to include page owner or manager who manages the page.

For the purposes of this specification, the term, 'visitor' is meant to include a social media platform or social media networking site subscriber who has logged on to the platform or site and visits a 'page'. It further is meant to include subscribers within the network of the user, not necessarily 'visiting' the page. For example, a subscriber likes a Facebook page on a third party site, and all the page activities are visible to him in news feed, email notification etc. One doesn't have to visit the page for any interaction then on.

With reference to a social media network, for a particular interest or business or product or service, an individual or an entity uses inherent templates to build a 'page'. This page serves as an online display for said interest or business or product or service. Moreover, each social media network includes tools and forums which can be used for leveraging the content of the built page. In accordance with the services and features of the social media network, the page allows a user to upload content to actively publicise the page and which content is of visitor interest. This activity further adds to the 'data' of the page. Also, the page may allow a visitor to comment or counter-comment on the page. This activity still further adds to the 'data' of the page.

Each page includes 'back-end data' which is generated by a user creating the page in order to categorise the page for purposes such as search engine optimization or social media marketing optimization. Further, each page includes 'front-end data' which is generated on a real-time basis depending upon two factors: 1) content uploaded by the page user; and 2) content uploaded by a visitor.

According to this invention, there is provided a system for automated recommendations for social media activities, said system comprises:

- page data extraction module adapted to extract pre-defined page data parameters in relation to pre-defined reference parameters;
- reference module adapted to provide reference parameters in relation to each of said pre-defined page data parameters;
- comparing and correlation module adapted to compare and correlate each of said extracted page data parameters with each of said corresponding reference parameters to obtain a corresponding comparative and correlative score for each of said parameters; and
- recommendation module adapted to recommend action points based on each of said comparative and correlative scores for each of said parameters and based on pre-defined system-defined parameters.

Typically, said page data extraction module includes social media data extracting tool adapted to extract data relating to each page.

Typically, said page data extraction module includes front end user data extraction tool adapted to extract front end data uploaded by a page owner.

Typically, said page data extraction module includes front visitor data extraction tool adapted to extract front end data uploaded by visitors.

Typically, said page data extraction module is a real-time page data extraction module Typically, said page data extraction module includes a social media data crawler to crawl each page for extracting such data.

Typically, said page data extraction module includes social media activity data extracting tool adapted to extract activity data relating to each page.

Typically, said page data extraction module includes a front end user activity extraction tool adapted to extract front end activity by a page owner.

Typically, said page data extraction module includes a front visitor activity extraction tool adapted to extract front end activity by visitors.

Typically, said page data extraction module includes a social media activity data crawler to crawl each page for extracting such activity data.

Typically, said page data extraction module includes categorisation means adapted to categorise each page based on pre-defined parameters of categorisation.

Typically, said reference module includes a database of categories.

Typically, said reference module includes a first categorised reference means adapted to store pre-defined reference parameters in relation to each category of a page based on absolute values defined by the system for each parameter which serve as best practices' data.

Typically, said reference module includes a database means comprising data in relation to every page for each categorised page.

Typically, said reference module includes a database means comprising data in relation to user engagement for each activity.

Typically, said reference module includes a second categorised reference means adapted to store pre-defined reference parameters in relation to each category of a page based on a pre-defined number of selected pages which serve as industry benchmarks.

Typically, said page data extraction module includes a demographics' capturing means adapted to capture demographics of visitors onto the page over a sampled duration of time.

Typically, said page data extraction module includes a page statistics' capturing means adapted to capture pre-defined statistics of a page.

Typically, said page data extraction module includes a demographics' capturing means adapted to capture demographics of visitors onto the page over a sampled duration of time such that said demographics' capturing means is a continuous real-time monitoring and capturing means.

Typically, said page data extraction module includes a page statistics' capturing means adapted to capture pre-defined statistics of a page such that said page statistics' capturing means is a continuous real-time monitoring and capturing means.

Typically, said comparing and correlation module includes a data combination and interpretation mechanism adapted to interpret correlation between activity on a page and visitor activity on the page.

Typically, said comparing and correlation module includes a page activity analysis engine adapted to analyse activities of the user in relation to first and second categorised reference means and pre-defined parameters as defined by said system.

Typically, said comparing and correlation module includes a visitor activity analysis engine adapted to analyse activities of visitors in relation to first and second categorised reference means and pre-defined parameters as defined by said system.

Typically, said comparing and correlation module includes a correlation engine for correlating visitor activity with respect to page activity in order to obtain a correlation map in relation to first categorised reference means, second categorised reference means, and pre-defined parameters as defined by said system.

Typically, said comparing and correlation module includes a weight assigning means adapted to assign a weighted score for each page activity based on pre-defined parameters in relation to correlation engine and first and second categorised reference means.

Typically, said comparing and correlation module includes a page activity analysis engine comprising a page activity comparator module adapted to compare captured page statistics with data from the database means.

Typically, said comparing and correlation module includes a visitor activity analysis engine comprising a visitor activity comparator module adapted to compare captured demographic statistics with data from the database means.

Typically, said comparing and correlation module includes a correlation mapping means adapted to provide a correlation map in relation to a user-visitor engagement quotient, in terms of each activity by the user, in terms of pre-defined reference parameters and further includes a weight assigning means adapted to generate a weighted score for each activity in relation to said correlation map based on reference parameters of the reference means.

Typically, said comparing and correlation module includes an internal parameter creation and update mechanism adapted to create pre-decided parameters in relation to activities that can be carried out on an page in relation to the social media networking platform that hosts the page.

Typically, said recommendation module includes a recommendation generation mechanism adapted to generate recommendations based on parameters and activities defined by the internal parameter creation and update mechanism, and the weighted score assigned to each activity by the data combination and interpretation mechanism.

Typically, said recommendation module includes a pointer means adapted to point each recommendation to an active link on the page hosted by the social media networking platform in order to allow the user to take instant action based on the weighted recommendation, thereby absolving said recommendation.

Typically, said recommendation module includes a page ranking mechanism adapted to rank each page in relation to at least one pre-defined engagement formula.

Typically, said recommendation module includes a visitor engagement ranking mechanism adapted to rank visitor engagement for each page.

Typically, said recommendation module includes a checking means adapted to check if each recommendation was acted upon.

Typically, said recommendation module includes an iteration means adapted to iterate said system after action on a recommendation, in order to generate new recommendation action points.

Typically, said recommendation module includes scorer means adapted to provide a score for each page in terms of pre-defined parameters.

Typically, said recommendation module includes a report generation means adapted to generate a report for score improvement, based on said scores.

Typically, said system includes a natural language processing mechanism adapted to parse and process language related to each activity in order to allow said system to understand the positive or negative connotation or influence of the page and its users.

Typically, said system includes a natural language processing mechanism adapted to parse and process language related to each activity, said natural language processing mechanism comprising Artificial Neural Networks, semantic analysis engines and databases, syntax analysis engines and databases to suitably rank a page in accordance with the parameters of said natural language processing mechanism.

Typically, said system includes an iterative updation means adapted to iteratively update the database means with best ranked pages in order to provide reference parameters.

Typically, said system includes a topic generation means adapted to recommend topics for the page in order to engage visitors, said topic generation means comprising:
  manually populated database of topics;
  search engine adapted to search for relevant or latest topics based on content from the natural language processing mechanism;
  topic crawler, for each page adapted to collect topics from the page in relation to its categorisation, data, and visitor inputs;
  aggregator mechanism adapted to aggregate news items, feed, current web activity, real time web events and the like information from the Internet in relation to each of said crawled topics;
  collective intelligence means adapted to correlate topics from said database, topics crawled by said crawler, and aggregated information by said aggregator mechanism in order to display potentially pertinent topics to a user or a visitor depending upon control settings of the system of this invention.

Typically, said system includes dashboard means adapted to showcase each of said recommendations generated by said recommendation generation mechanism.

Typically, said system includes dashboard means adapted to showcase each of said recommendations generated by said recommendation generation mechanism in a weight-assigned manner.

Typically, said system includes dashboard means adapted to include and showcase references to a pre-defined number of top-ranked pages for a corresponding category in relation to each page.

According to another embodiment of this invention, there is provided a method for automated recommendations for social media activities, said method comprises the steps of:
  extracting pre-defined page data parameters in relation to pre-defined reference parameters;
  providing reference parameters in relation to each of said pre-defined page data parameters;
  comparing and correlating each of said extracted page data parameters with each of said corresponding reference parameters to obtain a corresponding comparative and correlative score for each of said parameters; and
  recommending action points based on each of said comparative and correlative scores for each of said parameters and based on pre-defined system-defined parameters.

According to yet another embodiment of this invention, there is provided a computer readable medium containing executable code, for automated recommendations for social media activities, comprises:
  extracting pre-defined page data parameters in relation to pre-defined reference parameters;

providing reference parameters in relation to each of said pre-defined page data parameters;

comparing and correlating each of said extracted page data parameters with each of said corresponding reference parameters to obtain a corresponding comparative and correlative score for each of said parameters; and recommending action points based on each of said comparative and correlative scores for each of said parameters and based on pre-defined system-defined parameters.

Typically, said step of extracting pre-defined page data parameters includes a step of extracting data relating to each page.

Typically, said step of extracting pre-defined page data parameters includes a step of extracting front end data uploaded by a page owner.

Typically, said step of extracting pre-defined page data parameters includes a step of extracting front end data uploaded by visitors.

Typically, said step of extracting pre-defined page data parameters includes a step of extracting real-time page data parameters.

Typically, said step of extracting pre-defined page data parameters includes a step of crawling each page for extracting such data.

Typically, said step of extracting pre-defined page data parameters includes a step of extracting activity data relating to each page.

Typically, said step of extracting pre-defined page data parameters includes a step of extracting front end activity by a page owner.

Typically, said step of extracting pre-defined page data parameters includes a step of extracting front end activity by visitors.

Typically, said step of extracting pre-defined page data parameters includes a step of crawling each page for extracting such activity data.

Typically, said step of extracting pre-defined page data parameters includes a step of categorising each page based on pre-defined parameters of categorisation.

Typically, said step of providing reference parameters includes a step of creating a database of categories.

Typically, said step of providing reference parameters includes a step of storing pre-defined reference parameters in relation to each category of a page based on absolute values defined by the system for each parameter which serve as best practices' data or first categorised references.

Typically, said step of providing reference parameters includes a step of creating data in relation to every page for each categorised page.

Typically, said step of providing reference parameters includes a step of creating data in relation to user engagement for each activity.

Typically, said step of providing reference parameters includes a step of storing pre-defined reference parameters in relation to each category of a page based on a pre-defined number of selected pages which serve as industry benchmarks or second categorised references.

Typically, said step of extracting pre-defined page data parameters includes a step of capturing demographics of visitors onto the page over a sampled duration of time.

Typically, said step of extracting pre-defined page data parameters includes a step of capturing pre-defined statistics of a page.

Typically, said step of extracting pre-defined page data parameters includes a step of capturing demographics of visitors onto the page over a sampled duration of time in continuous real-time monitoring and capturing manner.

Typically, said step of extracting pre-defined page data parameters includes a step of capturing pre-defined statistics of a page such that said page statistics' capturing means is a continuous real-time monitoring and capturing means.

Typically, said step of comparing and correlating includes a step of interpreting correlation between activity on a page and visitor activity on the page.

Typically, said step of comparing and correlating includes a step of analysing activities of the user in relation to first and second categorised references and pre-defined parameters as defined by said method.

Typically, said step of comparing and correlating includes a step of analysing activities of visitors in relation to first and second categorised references and pre-defined parameters as defined by said method.

Typically, said step of comparing and correlating includes a step of correlating visitor activity with respect to page activity in order to obtain a correlation map in relation to first categorised references, second categorised references, and pre-defined parameters as defined by said method.

Typically, said step of comparing and correlating includes a step of assigning a weighted score for each page activity based on pre-defined parameters in relation to a correlation map and first and second categorised references.

Typically, said step of comparing and correlating includes a step of comparing captured page statistics with created data.

Typically, said step of comparing and correlating includes a step of comparing captured demographic statistics with created data.

Typically, said step of comparing and correlating includes a step of providing a correlation map in relation to a user-visitor engagement quotient, in terms of each activity by the user, in terms of pre-defined reference parameters and further includes a step of generating weighted score for each activity based on change in said weighted score.

Typically, said step of comparing and correlating includes a step of creating pre-decided parameters in relation to activities that can be carried out on an page in relation to the social media networking platform that hosts the page.

Typically, said step of recommending action points includes a step of generating recommendations based on created parameters and activities, and assigned weighted scores to each activity.

Typically, said step of recommending action points includes a step of pointing each recommendation to an active link on the page hosted by the social media networking platform in order to allow the user to take instant action based on the weighted recommendation, thereby absolving said recommendation.

Typically, said step of recommending action points includes a step of ranking each page in relation to at least one pre-defined engagement formula.

Typically, said step of recommending action points includes a step of ranking visitor engagement for each page.

Typically, said step of recommending action points includes a step of checking if each recommendation was acted upon.

Typically, said step of recommending action points includes a step of iterating said method steps after action on a recommendation, in order to generate new recommendation action points.

Typically, said step of recommending action points includes a step of providing a score for each page in terms of pre-defined parameters.

Typically, said step of recommending action points includes a step of generating a report for score improvement, based on said scores.

Typically, said method includes a step of parsing and processing language related to each activity in order to allow said method to understand the positive or negative connotation or influence of the page and its users.

Typically, said method includes a step of parsing and processing language related to each activity, said steps based on Artificial Neural Networks, semantic analysis engines and databases, syntax analysis engines and databases to suitably rank a page in accordance with the parameters of said natural language processing.

Typically, said method includes a step of iteratively updating created data with best ranked pages in order to provide reference parameters.

Typically, said method includes a step of generating topics for the page in order to engage visitors, said method comprising the steps of:
manually populating database of topics;
searching for relevant or latest topics based on content from the natural language processing mechanism;
collecting topics from the page, by crawling, in relation to its categorisation, data, and visitor inputs;
aggregating news items, feed, current web activity, real time web events and the like information from the Internet in relation to each of said crawled topics;
correlating topics from said database, topics crawled by said crawler, and aggregated information by said aggregator mechanism in order to display potentially pertinent topics to a user or a visitor depending upon control settings of the method of this invention.

Typically, said method includes a step of showcasing each of said recommendations.

Typically, said method includes a step of showcasing each of said recommendations in a weight-assigned manner.

Typically, said method includes a step of showcasing references to a pre-defined number of top-ranked pages for a corresponding category in relation to each page.

BRIEF DESCRIPTION OF THE ACCOMPANYING DRAWINGS

The invention will now be described in relation to the accompanying drawings, in which:

FIG. 2 illustrates a schematic representation of recommended action points (R) in a ranked manner from R1 to R9;

DETAILED DESCRIPTION OF THE ACCOMPANYING DRAWINGS

According to this invention, there is provided a system and method for automated recommendations for social media activities.

The present invention, in a preferred embodiment, provides systems and methods for generating automated recommendations for social media activities, the system comprising:
a) a user;
b) a computing device;
c) a network that allows access to a 'social media facility';
d) a data storage device or a server; and
e) a social media activity recommendation system;
wherein the user through the computing device uses the 'social media activity recommendation system' which provides automated recommendations for social media activities in one or more social media facilities.

Each page of a social media networking site or platform (social media facilities) is a social media element component such that it is a part of one or more social media facilities.

Figure 1:
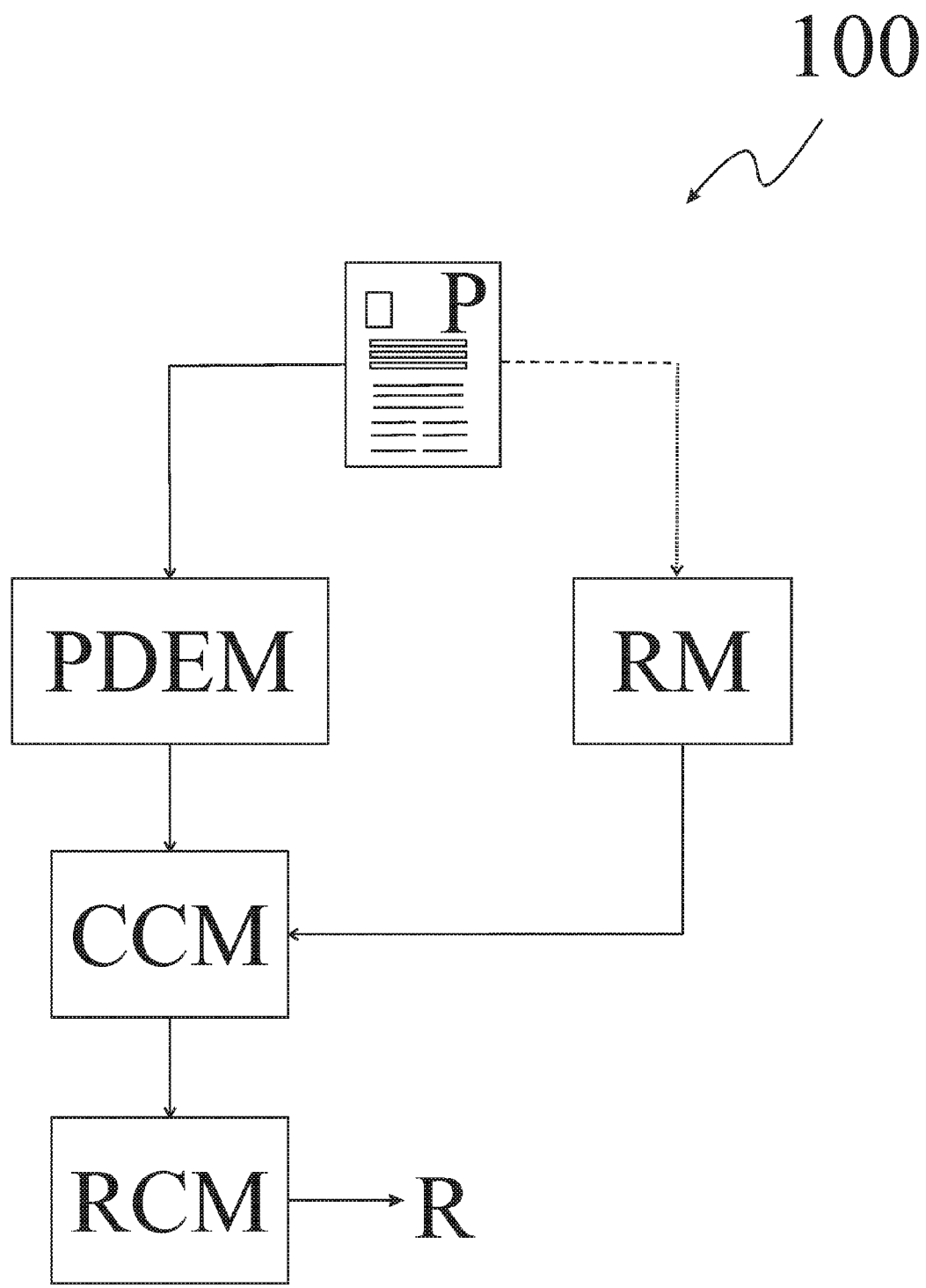
FIG. 1 illustrates a basic schematic of the system of this invention.

FIG. 1 illustrates a basic schematic of the system (100) of this invention.

Figure 3:
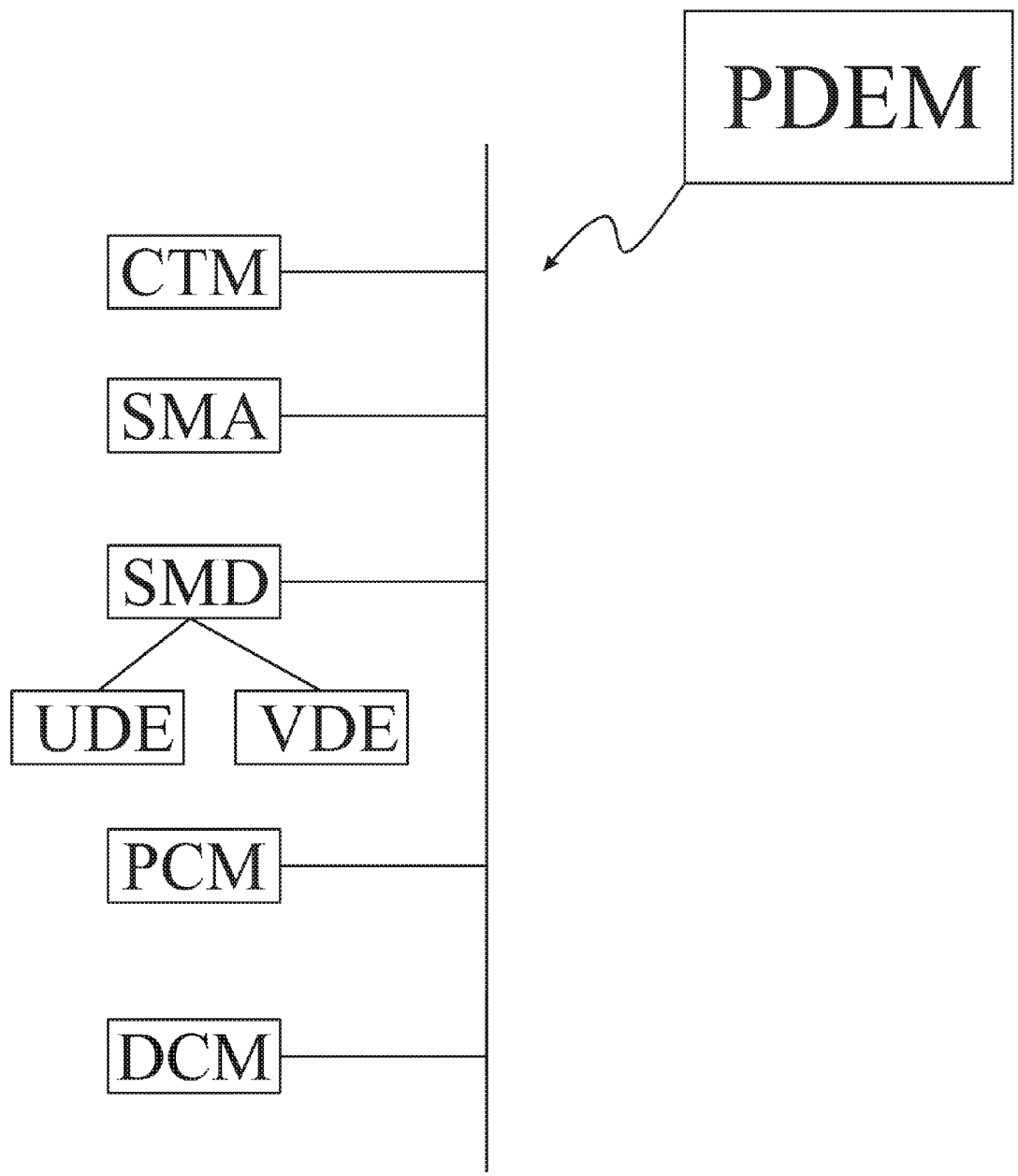
FIG. 3 illustrates a schematic of the page data extraction module of the system of FIG. 1.

In accordance with a first embodiment of this invention, there is provided a page data extraction module (PDEM) adapted to extract pre-defined page (P) data parameters in relation to pre-defined reference parameters. FIG. 3 illustrates a schematic of the page data extraction module of the system of FIG. 1.

Figure 4:
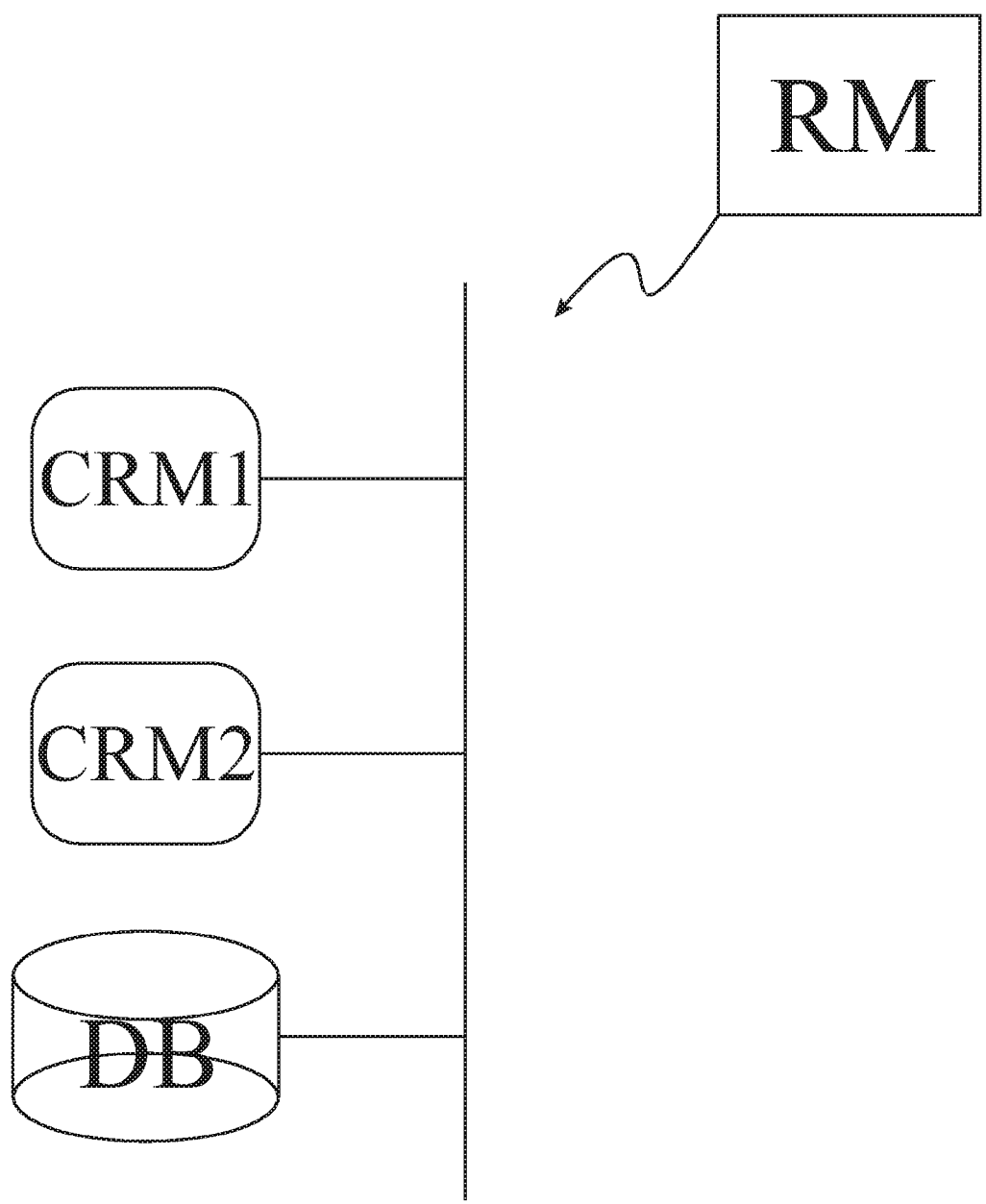
FIG. 4 illustrates a schematic of the reference module of the system of FIG. 1.

In accordance with a second embodiment of this invention, there is provided a reference module (RM) adapted to provide reference parameters in relation to each of said pre-defined page data. FIG. 4 illustrates a schematic of the reference module of the system of FIG. 1.

Figure 5:
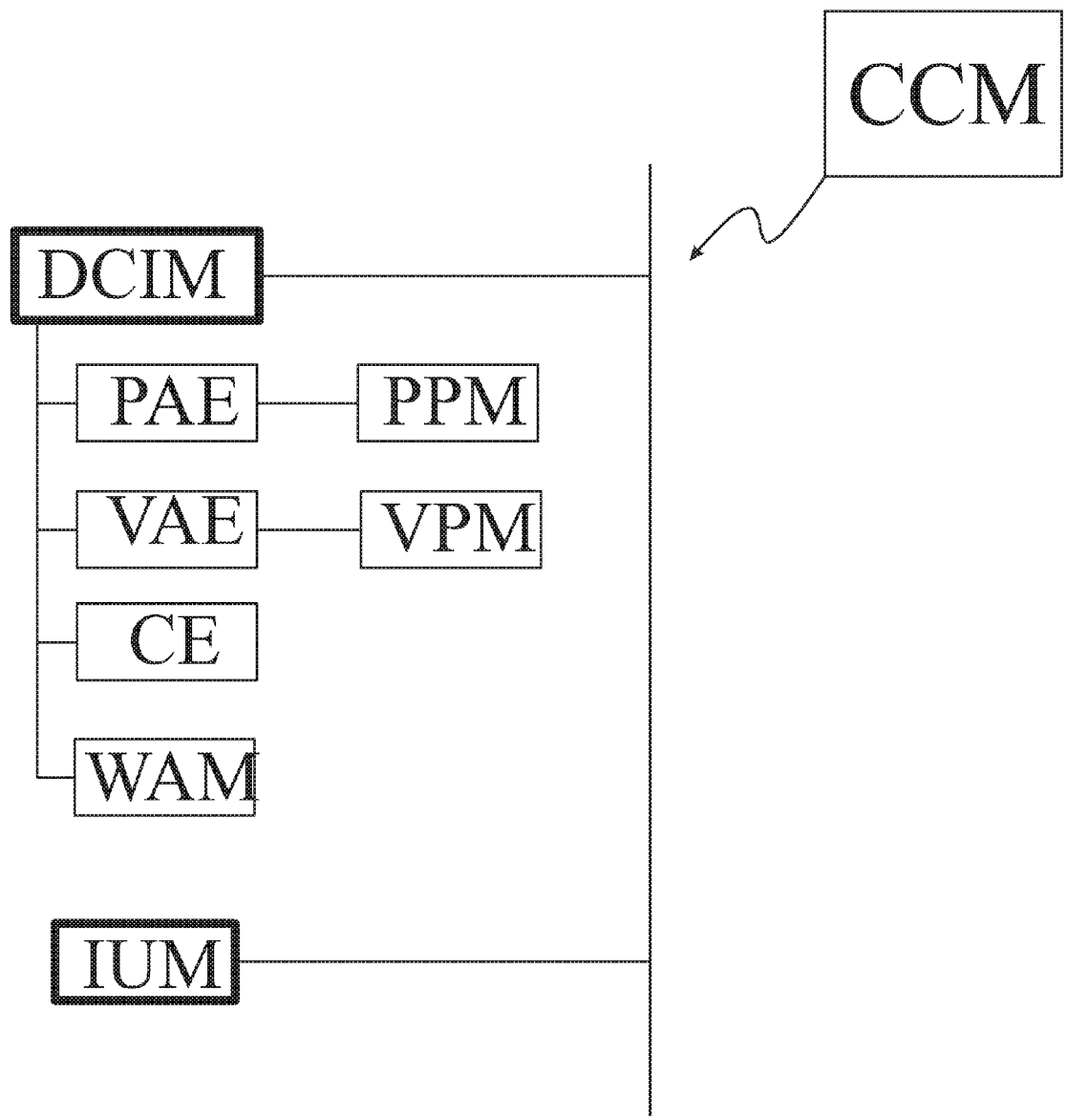
FIG. 5 illustrates a schematic of the comparing and correlation module of the system of FIG. 1.

In accordance with a third embodiment of this invention, there is provided a comparing and correlation module (CCM) adapted to compare and correlate each of said extracted page data parameters with each of said corresponding reference parameters to obtain a corresponding comparative and correlative score for each of said parameters. FIG. 5 illustrates a schematic of the comparing and correlation module of the system of FIG. 1.

Figure 6:
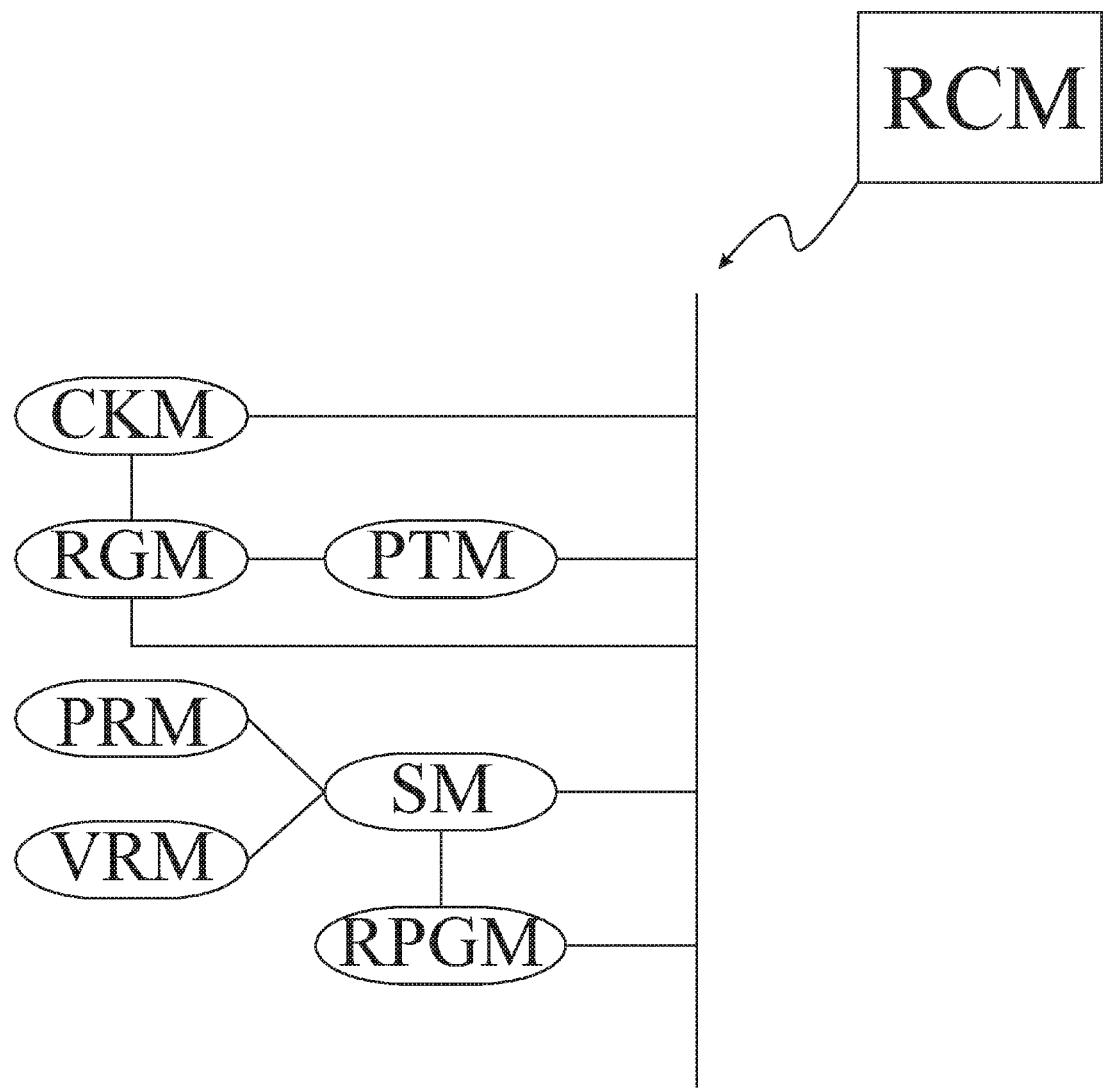
FIG. 6 illustrates a schematic of the recommendation module of the system of FIG. 1.

In accordance with a fourth embodiment of this invention, there is provided a recommendation module (RCM) adapted to recommend action points (R) based on each of said comparative and correlative scores for each of said parameters. FIG. 6 illustrates a schematic of the recommendation module of the system of FIG. 1.

Figure 2:
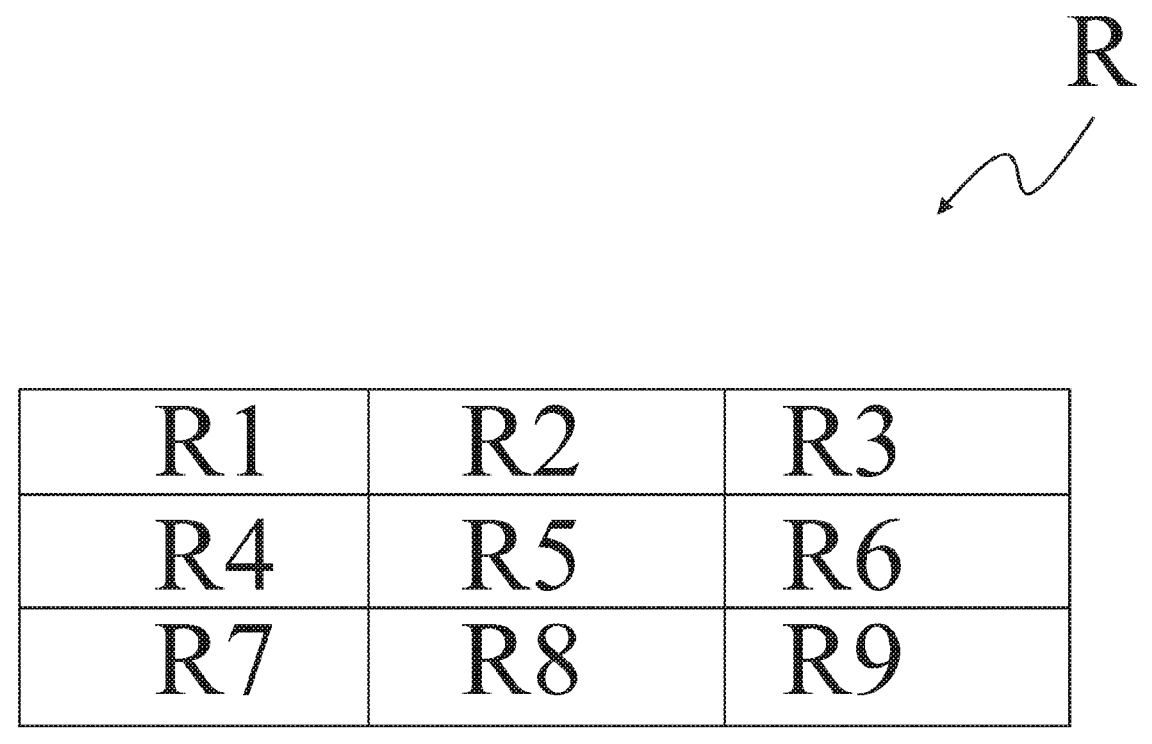

FIG. 2 illustrates a schematic representation of recommended action points (R) in a ranked manner from R1 to R9.

In accordance with an embodiment of this invention, there is provided a social media data extracting tool (SMD) adapted to extract data relating to each page. This may include a front end user data extraction tool (UDE) adapted to extract front end data uploaded by a page owner. It may further include front visitor data extraction tool (VDE) adapted to extract front end data uploaded by visitors. The extraction of data allows for page categorisation. The compilation of data occurs in during an initialisation phase as well as in real-time mode, as and how the page is updated. A social media data crawler is engaged to crawl each page for extracting such data.

In accordance with another embodiment of this invention, there is provided a categorisation means (CTM) adapted to categorise each page based on pre-defined parameters of categorisation. There is provided a database of categories. These categories are initially pre-populated by manual entry. A defined number of categories exist. Exemplary non-limiting embodiments of these categories include finance page, news page, product page, service page, or the like. The categorisation is an important parameter as the future activities or the embodiments of the system and method of this invention work coherently only upon accurate categorisation. Hence, there may be a human element involved in the categorisation means.

In accordance with yet another embodiment of this invention, there is provided a social media activity data extracting tool (SMA) adapted to extract activity data relating to each page. This may include a front end user activity extraction tool adapted to extract front end activity by a page owner. It may further include front visitor activity extraction tool adapted to extract front end activity by visitors. A social media activity data crawler is engaged to crawl each page for extracting such activity data.

In accordance with still another embodiment of this invention, there is provided a first categorised reference means (CRM1) adapted to store pre-defined reference parameters in relation to each category of a page based on absolute values defined by the system for each parameter. The stored pre-defined reference parameters include reference templates for page layout, reference updates for types of updates, reference activities for types of activities depending upon the social media networking platform that the page is created on, reference frequency of updates, reference frequency of activities. These serve as best practices' data and are absolute high values for each parameter. According to one non-limiting exemplary embodiment of a reference parameter of a reference means may be a status update on a technology page for every 4 to 6 hours as compared to a reference parameter for a news site for every 5 minutes.

In accordance with an additional embodiment of this invention, there is provided a database means (DB) comprising data in relation to every page for each categorised page. It may also include data in relation to user engagement for each activity.

In accordance with yet an additional embodiment of this invention, there is provided a second categorised reference means (CRM2) adapted to store pre-defined reference parameters in relation to each category of a page based on a pre-defined number of selected pages. The stored pre-defined reference parameters include reference templates for page layout, reference updates for types of updates, reference activities for types of activities depending upon the social media networking platform that the page is created on, reference frequency of updates, reference frequency of activities. These references are industry benchmarks which are extracted by the system and may be iteratively populated in accordance with rated parameters or ranked pages.

In accordance with still an additional embodiment of this invention, there is provided a demographics' capturing means (DCM) adapted to capture demographics of visitors onto the page over a sampled duration of time. Commonly examined demographics include gender, race, age, location, employment status, interests, activities on the social media networking platform, activities on the page, and the like. The samples duration of time is a feature which helps analyse recurring trends or revisit status or frequency of visit or the like visitor information.

In accordance with another additional embodiment of this invention, there is provided a page statistics' capturing means (PCM) adapted to capture pre-defined statistics of a page. This is a continuous real-time monitoring and capturing means. The page statistics include, but are not limited to, number of visitors visiting the page, amount of time a visitor spends on a page, location of the visitor who visits the page, frequency of visit of each visitor, activity of each visitor on the page, and the like.

In accordance with yet another additional embodiment of this invention, there is provided a data combination and interpretation mechanism (DCIM) adapted to interpret correlation between activity on a page and visitor activity on the page. This data combination and interpretation mechanism comprises:

page activity analysis engine (PAE) adapted to analyse activities of the user in relation to first and second categorised reference means and pre-defined parameters as defined by the system of this invention;

visitor activity analysis engine (VAE) adapted to analyse activities of visitors in relation to first and second categorised reference means and pre-defined parameters as defined by the system of this invention;

correlation engine (CE) for correlating visitor activity with respect to page activity in order to obtain a correlation map in relation to first categorised reference means, second categorised reference means, and pre-defined parameters as defined by the system of this invention;

weight assigning means (WAM) adapted to assign a weighted score for each page activity based on pre-defined parameters in relation to correlation engine and first and second categorised reference means.

The page activity analysis engine includes a page activity comparator module (PPM) adapted to compare captured page statistics with data from the database means.

The visitor activity analysis engine includes a visitor activity comparator module (VPM) adapted to compare captured demographic statistics with data from the database means.

The correlation map provides a user-visitor engagement quotient, in terms of each activity by the user, in terms of pre-defined reference parameters. A dip in the quotient or a mismatch in the map in relation to reference parameters of the reference means should generate a weighted score for that activity.

The page activity analysis engine (PAE) refers to activity performed by the user or owner of the page on the page. This activity may be suo moto activity or may be in correlation to a visitor activity. These activities include posting a new topic of indulgence or relevance, uploading links or photographs, commenting, counter-commenting, replying, messaging, sharing, or the like.

The visitor activity analysis engine (VAE) refers to activity performed by visitors on a particular page. Cumulative account of activity of visitors on a particular page is taken into consideration. This activity may be suo moto activity or may be in correlation to a user activity. These activities include posting a new topic of indulgence or relevance, uploading links or photographs, commenting, counter-commenting, replying, messaging, sharing, or the like.

In accordance with still another additional embodiment of this invention, there is provided an internal parameter creation and update mechanism (IUM) adapted to create pre-decided parameters in relation to activities that can be carried out on an page in relation to the social media networking platform that hosts the page. The parameters for activities may include, but not be limited to, 1) making more updates; 2) sharing more photos; 3) sharing status updates; 4) sharing links; 5) sharing videos; 6) sharing albums; 7) activating visitor base; 8) generate advertisements; 9) generate more visitors; and the like.

In accordance with another additional embodiment of this invention, there is provided a recommendation generation mechanism (RGM) adapted to generate recommendations based on parameters and activities defined by the internal parameter creation and update mechanism, and the weighted score assigned to each activity by the data combination and interpretation mechanism.

In accordance with yet another embodiment of this invention, there is provided a pointer means (PTM) adapted to point each recommendation to an active link on the page hosted by the social media networking platform in order to allow the user to take instant action based on the weighted recommendation. This enables a user to resolve the recommendation issue such that the particular recommendation and further recommendations may be subsequently absolved by appropriate user action. This also makes the user understand as to why the recommendation was made. Accordance to a non-limiting exemplary embodiment, the recommendation generation mechanism may recommend sharing photos. In this case, the pointer means, upon engagement by the user, allows the user to be directly pointed towards the resource on the page which facilitates the uploading or sharing of photos. The completion of this task results in resolving the weighted recommendation which can then disappear.

In accordance with still another embodiment of this invention, there is provided a page ranking mechanism (PRM) adapted to rank each page. The page may be ranked in terms of an engagement rate formula. One such example of an engagement rate formula is:

[engagement rate]=[likes+comments]/[visitor count*total posts]

As the ranking increases, a best page or a defined number of top best pages may be created and incorporated into the database for use by the second categorised reference means.

In accordance with an additional embodiment of this invention, there is provided a visitor engagement ranking mechanism (VRM) adapted to rank visitor engagement for each page.

In accordance with yet an additional embodiment of this invention, there is provided a checking means (CKM) adapted to check if each recommendation was acted upon. Whenever an action on a recommendation takes place, the various embodiments of the system of this invention are actuated to rank the page and corresponding visitor engagement. Based on a comparison of previous page rank and previous visitor rank in relation to current page rank and current visitor rank, the data combination and interpretation mechanism along with recommendation generation mechanism iteratively generates appropriate recommendations and appropriately assigns weights to the generated recommendations.

Each of the activities for a particular social networking site is pre-defined. Weightage to each activity is dynamic in nature; hence weight assigning, by means of weight assigning means (WAM), is a dynamic activity. Based on page ranking mechanism (PRM), visitor engagement ranking mechanism (VRM), and checking means (CKM), weight assignment to each activity or reference parameter is performed.

In accordance with still an additional embodiment of this invention, there is provided a scorer means (SM) adapted to provide a score for each page in terms of pre-defined parameters which include, but are not limited to, list of activities on the page, current engagement rate, current visitor count, target engagement rate, target visitor count, and the like.

In accordance with another additional embodiment of this invention, there is provided a report generation means (RPGM) adapted to generate a report for score improvement, based on said scores.

Figure 7:
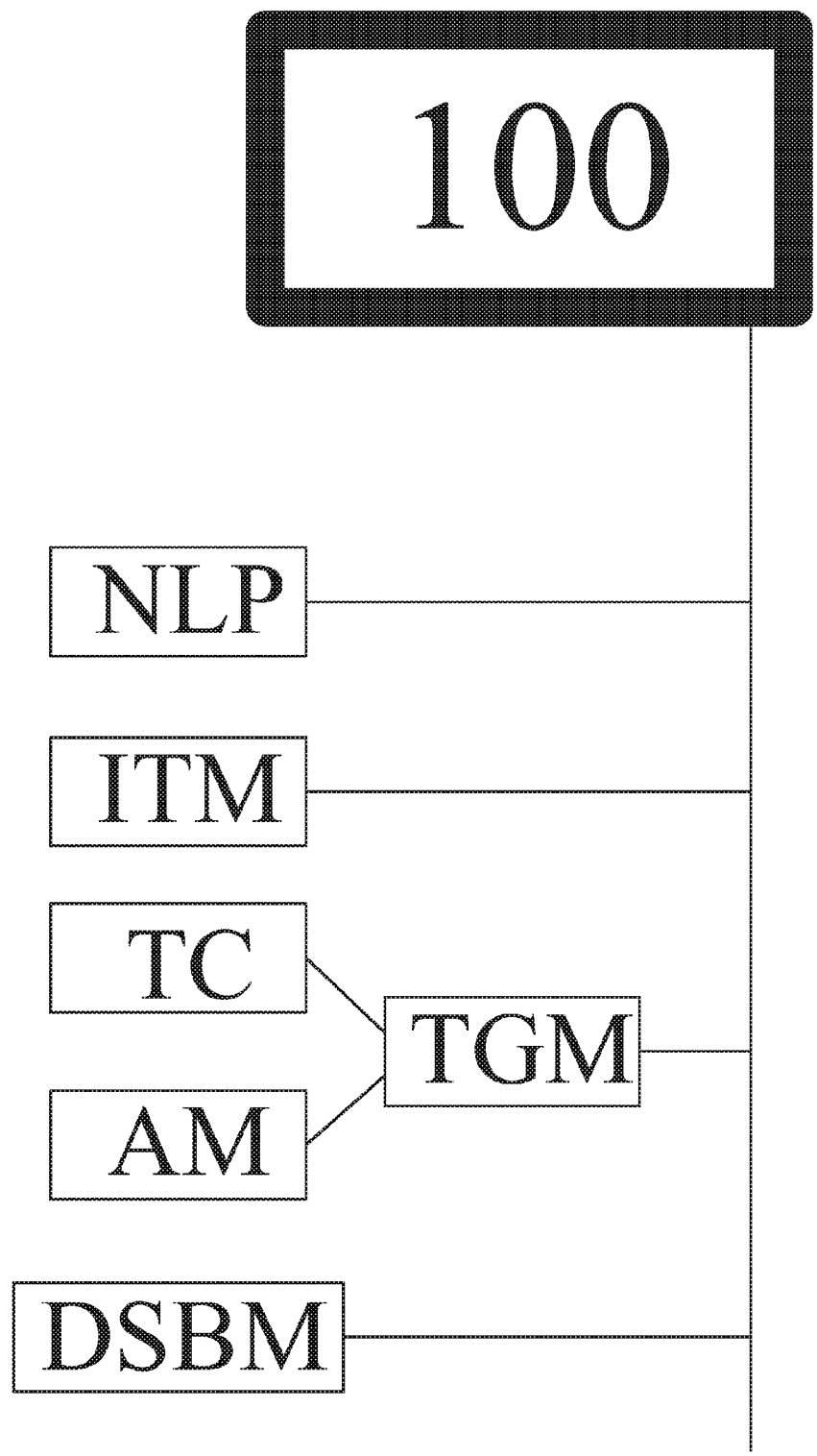
FIG. 7 illustrates additional embodiments of the system of FIG. 1.

FIG. 7 illustrates additional embodiments of the system of FIG. 1.

In accordance with yet another additional embodiment of this invention, there is provided a natural language processing mechanism (NLP) adapted to parse and process language related to each activity. This processed data allows the system to understand the positive or negative connotation or influence of the page and its users. This aids in the ranking mechanism. Artical Neural Networks, semantic analysis engines and databases, syntax analysis engines and databases are employed to suitably rank a page in accordance with the parameters of said natural language processing mechanism.

In accordance with still another additional embodiment of this invention, there is provided an iterative updation means (ITM) adapted to update the database means with best ranked pages in order to provide reference parameters.

In accordance with another embodiment of this invention, there is provided a topic generation means (TGM) adapted to recommend topics for the page in order to engage visitors. The topic generation mechanism may include a manually populated database of topics. Alternatively, it may include a search engine to search for relevant or latest topics based on content from the natural language processing mechanism. A topic crawler (TC), for each page, is adapted to collect topics from the page in relation to its categorisation, data, and visitor inputs. Further, an aggregator mechanism (AM) is adapted to aggregate news items, feed, current web activity, real time web events and the like information from the Internet in relation to each of said crawled topics. Still further, a collective intelligence means is adapted to correlate topics crawled by said crawler and aggregated information by said aggregator mechanism in order to display potentially pertinent topics to a user or a visitor depending upon control settings of the system of this invention.

In accordance with yet another embodiment of this invention, there is provided a dashboard means (DSBM) adapted to showcase each of said recommendations generated by said recommendation generation mechanism. This showcase may or may not be in a weighted and ranked form. Further, the dashboard means may include references to a pre-defined number of top-ranked pages for a corresponding category in relation to each page. These references may be thumbnails, images, snapshots, text, pointers or the like.

In an embodiment of the invention, the social media activity data and metadata includes but is not limited to, data associated with one or more of, users, similar social media sites, time of accessing social media, place of accessing social media, comments or posts published, files shared.

In an embodiment of the invention, data associated with users include but is not limited to data of, age, sex, interest, language, qualification, profession, location, frequency of visits, favourites, or any combination thereof.

In an embodiment of the invention, the system may use language translation tools and programs for translation of input data or output data.

In an embodiment of the invention, social media activity can be derived using social media facility unique features which may be different for different social media facilities, and examples of which may be followers, like, plus, comment, share, recommend, tags or a combination thereof.

In an embodiment of the invention, the systems and methods of the present invention may be used in various applications, such as but not limited to,
a. acting in quick time on the shortcomings of social media presence,
b. improving effectiveness of social media activities,
c. generating business leads,
d. increasing visibility of the brand,
e. engaging with customers and improve stickiness.

The data, in each of the means of the system and method of this invention, may be 'encrypted' and suitably 'decrypted' when required.

In an embodiment of the invention, a social media facility is selected from a set of but not limited to Zooppa, Zoo.gr, Yelp, Inc., Yammer, Xt3, XING, Xanga, WriteAPrisoner.com, WiserEarth, Windows Live Spaces, weRead, Werkennt-wen, WeOurFamily, WeeWorld, WebBiographies, WAYN, Wasabi, Wattpad, Wakoopa, Vox, Virb, Viadeo, Vampirefreaks.com, Vkontakte, Twitter, Tumblr, Tuenti, Trombi.com, tribe.net, Travellerspoint, TravBuddy.com, TermWiki, TeachStreet, Taringa!, Taltopia, Talkbiznow, TalentTrove, Tagged, StumbleUpon, StudiVZ, Stickam, SoundCloud, Sonico.com, SocialVibe, Social_Life_(website), Skyrock, Shelfari, ShareTheMusic, Scispace.net, ScienceStage, Ryze, ReverbNation.com, ResearchGate, Renren, Ravelry, Raptr, Qzone, Quechup, Qapacity, Present.ly, Plurk, Playlist.com, Playfire, PureVolume, Playahead, Plaxo, Pingsta, Partyflock, PatientsLikeMe, Passportstamp, OUTeverywhere, Orkut, Open Diary, OneWorldTV, OneClimate, Odnoklassniki, Ning, NGO Post, Nexopia, Nettby, Netlog, Nasza-klasa.pl, myYearbook, Myspace, My Opera, MyLife, MyHeritage, MyAnimeList, Muxlim, Multiply, Mubi (website), MouthShut.com, MOG, MocoSpace, mobikade, Mixi, Meettheboss, Meetup.com, MEETin, Makeoutclub, LunarStorm, Live mocha, LiveJournal, Listography, LinkExpats, LinkedIn, Lifeknot, LibraryThing, Last.fm, LaiBhaari, Lafango, Kiwibox, Kaixin001, Jaiku, iWiW, Itsmy, InterNations, italki.com, IRC-Galleria, Indaba Music, Identi.ca, Ibibo, Hyves, Hub Culture, HR.com, Hotlist, Hospitality Club, hi5, Habbo, Grono.net, GovLoop, Google Buzz, Google+, Goodwizz, Goodreads, Gogoyoko, Geni.com, Gays.com, Gather.com, GamerDNA, Gaia Online, Fubar, Frühstückstreff, Friendster, Friends Reunited, Foursquare, Fotolog, Fotki, Focus.com, Flickr, Flixster, FledgeWing, FilmAffinity, Fetlife, Faces.com, Faceparty, Facebook, Exploroo, Experience Project, Eons.com, Epernicus, Elftown, DXY.cn, douban, Draugiem.lv, DontStayIn, Dol2day, Disaboom, deviantART, delicious, Decayenne, DailyStrength, DailyBooth, Cyworld, Crunchyroll, Cross.tv, CozyCot, CouchSurfing, Cloob, Classmates.com, Cellufun, CaringBridge, Care2, Cake Financial, CafeMom, Buzznet, Bolt.com, Blogster, Blauk, BlackPlanet, Biip.no, BIGADDA, Bebo, Badoo, Avatars United, Audimated.com, Athlinks, AsianAvenue, aSmallWorld, allobii, Advogato, Academia.edu, blogs, or any combination thereof.

The systems of the present invention in an embodiment are made accessible through a portal or an interface which is a part of, or may be connected to, the internet or World Wide Web or any similar portal, wherein the portals or interfaces are accessed by one or more of users through an electronic device, whereby the user may send and receive data to the portal or interface which gets stored in at least one memory device or at least one data storage device or at least one server, and utilises at least one processing unit. The portal or interface in combination with one or more of memory device, data storage device, processing unit and serves, form an embedded computing setup, and may be used by, or used in, one or more of a computer program product. In an embodiment of the invention, the embedded computing setup and optionally one or more of a computer program product, in relation with, and in combination with the said portal or interface forms one of the systems of the invention. Typical examples of a portal or interface may be selected from but is not limited to a website, an executable software program or a software application.

In an embodiment of the invention, the systems and methods of the invention may simultaneously involve more than one user or more than one data storage device or more than one host server or any combination thereof.

In an embodiment of the invention, a user may provide user input through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, a cave, pointing stick In an embodiment of the invention, the systems and methods can be practised using any electronic device which may be connected to one or more of other electronic device with wires or wirelessly which may use technologies such as but not limited to, Bluetooth, WiFi, Wimax. This will also extend to use of the aforesaid technologies to provide an authentication key or access key or electronic device based unique key or any combination thereof.

In an embodiment of the invention, the systems and methods can be practised using any electronic device which may contain or may be infected by one or more of an undesirable software such as but not limited to a virus, or a Trojan, or a worm, malware, spyware, adware, scareware, crimeware, rootkit or any combination thereof.

In an embodiment of the invention the system may involve software updates or software extensions or additional software applications.

In an embodiment of the invention, any form of internet security such as but not limited to, a firewall or antivirus or antimalware or registry protection can be used by a user in the same or different electronic device either simultaneously or separately, along with the systems or methods of the present invention.

In an embodiment of the invention one or more user can be blocked or denied access to one or more of the aspects of the invention.

In an embodiment of the invention, the "social media activity data and metadata" may be stored or processed or exchanged in encrypted or coded or encoded or scrambled or translated or ciphered form.

The term 'encrypt' or 'encryption' means the process of converting digital information into a new form using a key or a code or a program, wherein the new form is unintelligible or indecipherable to a user or a thief or a hacker or a spammer. The term 'encryption' includes encoding, compressing, or any other translating of the digital content. The encryption of the digital media content is performed in accordance with an encryption/decryption algorithm. The encryption/decryption algorithm utilized is not hardware dependent and may change depending on the digital content. For example, a different algorithm may be utilized for different websites or programs. The term 'encryptio'n further includes one or more aspects of authentication, entitlement, data integrity, access control, confidentiality, segmentation, information control, and combinations thereof.

The described embodiments may be implemented as a system, method, apparatus or article of manufacture using standard programming and/or engineering techniques related to software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In an embodiment of the invention the term network means a system allowing interaction between two or more electronic devices, and includes any form of inter/intra enterprise environment such as the world wide web, Local Area Network (LAN), Wide Area Network (WAN), Storage Area Network (SAN) or any form of Intranet.

In an embodiment of the invention, the systems and methods can be practised using any electronic device. An electronic device for the purpose of this invention is selected from any device capable of processing or representing data to a user and providing access to a network or any system similar to the interne, wherein the electronic device may be selected from but not limited to, personal computers, mobile phones, laptops, palmtops, portable media players and personal digital assistants.

In an embodiment of the invention computer program code for carrying out operations or functions or logic or algorithms for aspects of the present invention may be written in any combination of one or more programming languages which are either already in use or may be developed in future, such as but not limited to Java, Smalltalk, C++, C, Foxpro, Basic, HTML, PHP, SQL, Javascript, COBOL, Extensible Markup Language (XML), Pascal, Python, Ruby, Visual Basic .NET, Visual C++, Visual C#.Net, Python, Delphi, VBA, Visual C++.Net, Visual FoxPro, YAFL, XOTcl, XML, Wirth, Water, Visual DialogScript, VHDL, Verilog, UML, Turing, TRAC, TOM, Tempo, Tcl-Tk, T3X, Squeak, Specification, Snobol, Smalltalk, S-Lang, Sisal, Simula, SGML, SETL, Self, Scripting, Scheme, Sather, SAS, Ruby, RPG, Rigal, Rexx, Regular Expressions, Reflective, REBOL, Prototype-based, Proteus, Prolog, Prograph, Procedural, PowerBuilder, Postscript, POP-11, PL-SQL, Pliant, PL, Pike, Perl, Parallel, Oz, Open Source, Occam, Obliq, Object-Oriented, Objective-C, Objective Caml, Obfuscated, Oberon, Mumps, Multiparadigm, Modula-3, Modula-2, ML, Miva, Miranda, Mercury, MATLAB, Markup, m4, Lua, Logo, Logic-based, Lisp (351), Limbo, Leda, Language-OS Hybrids, Lagoona, LabVIEW, Interpreted, Interface, Intercal, Imperative, IDL, Icl, ICI, HyperCard, HTMLScript, Haskell, Hardware Description, Goedel, Garbage Collected, Functional, Frontier, Fortran, Forth, Euphoria, Erlang, ElastiC, Eiffel, E, Dylan, DOS Batch, Directories, Declarative, Dataflow, Database, D, Curl, C-Sharp, Constraint, Concurrent, Component Pascal, Compiled, Comparison and Review, Cocoa, CobolScript, CLU, Clipper, Clean, Clarion, CHILL, Cecil, Caml, Blue, Bistro, Bigwig, BETA, Befunge, BASIC, Awk, Assembly, ASP, AppleScript, APL, Algol 88, Algol 60, Aleph, ADL, ABEL, ABC, or similar programming languages.

In an embodiment, the data storage unit or data storage device is selected from a set of but not limited to USB flash drive (pen drive), memory card, optical data storage discs, hard disk drive, magnetic disk, magnetic tape data storage device, data server and molecular memory.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude or rule out the presence or addition of one or more other features, integers, steps, operations, elements, components, and/or groups thereof.

The process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

In addition to the embodiments and examples shown, numerous variants are possible, which may be obvious to a person skilled in the art relating to the aspects of the invention.

EXAMPLE

'XYZ Ltd' has a Fanpage on Facebook. The company posts status messages periodically to its page. However, inspite of having over 2000 fans on the page, the company's messages on the page generate only 2 or 3 responses.

The present invention in an example of an embodiment, can perform the following functions on the Fanpage of XYZ Ltd:

a. Gather data of page statistics from API of Facebook
b. Analyse how many of the fans are able to get a news feed about the status updates of XYZ
c. Analyse the data to understand which type of status updates are the most effective and which have been ineffective
d. Analyse if any other kind of activity, such as posting photos or albums is more effective
e. Analyse which users have been most active
f. Analyse which users have been inactive after being active initially
g. Analyse the effectiveness of similar users (same business category or geography) on Facebook
h. Apply the recommendation algorithm to the observations
i. Provide a report of recommendations
j. Monitor the execution of recommendations While this detailed description has disclosed certain specific embodiments of the present invention for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

I claim:

1. A computer-implemented method for automated recommendations for social media activities implemented by one or more processors of a computing device that is operatively coupled to a network, said method comprising the steps of:
   extracting pre-defined page data parameters in relation to pre-defined reference parameters;
   providing reference parameters in relation to each of said pre-defined page data parameters;
   comparing and correlating each of said extracted pre-defined page data parameters with each of said corresponding reference parameters to obtain a corresponding comparative and correlative score for each of said pre-defined page data parameters;
   recommending action points based on each of said comparative and correlative scores for each of said pre-defined page data parameters and based on pre-defined system-defined parameters;
   recommending topics for a page in order to engage visitors, including:
   manually populating a database of topics;
   searching for relevant or latest topics based on content from a natural language processing mechanism;
   crawling the page to collect crawled topics from the page in relation to a categorization, data, and visitor inputs associated with the page;
   aggregating news items, feed data, current web activity, and real time web events from an internet in relation to each of said crawled topics; and
   correlating topics from said database, said crawled topics, and said aggregated information in order to display potentially pertinent topics to a user or a visitor of the page.

2. The method as claimed in claim 1, wherein said step of extracting pre-defined page data parameters comprises a series of steps selected from a group of steps consisting of:
   extracting social media data relating to each page;
   extracting front end user data uploaded by a page owner;
   extracting front end visitor data uploaded by visitors;
   crawling each page for extracting data;
   extracting social media activity data relating to each page;
   extracting front end activity by the page owner;
   extracting front end activity by visitors;
   crawling each page for extracting social media activity data; and
   categorizing each page based on pre-defined parameters of categorization.

3. The method as claimed in claim 2, wherein said step of providing reference parameters comprises the steps of:
   maintaining a first database of categories;
   storing pre-defined reference parameters in relation to each category of the page using a first categorized reference store;
   storing data in said each categorized page in a second database; and
   storing pre-defined reference parameters in relation to each category of the page based on a pre-defined number of selected pages using a second categorized reference store.

4. The method as claimed in claim 3, wherein said step of comparing and correlation comprises the steps of:
   interpreting correlation between activity on a page and visitor activity on the page; and analyzing activities of the user in relation to said first and second categorized reference stores and said pre-defined page data parameters.

5. The method as claimed in claim 3, wherein said step of comparing and correlating comprises the steps of:
   analyzing activities of visitors in relation to said first and second categorized reference stores and said pre-defined page data parameters;
   correlating visitor activity with respect to page activity in order to obtain a correlation map in relation to said first categorized reference store, said second categorized reference store, and said pre-defined page data parameters.

6. The method as claimed in claim 3, wherein said step of comparing and correlating comprises the steps of:
   comparing page statistics with data from the second database; and
   comparing demographic statistics with data from the second database.

7. The method as claimed in claim 3, wherein said method includes a step of iteratively updating the second database with best ranked pages in order to provide reference parameters.

8. The method as claimed in claim 1, wherein said step of extracting pre-defined page data parameters comprises the steps of:
   capturing demographics of visitors onto the page through a continuous real-time monitoring and capturing sub-module; and
   capturing pre-defined statistics of the page through a continuous real-time monitoring and capturing sub-module.

9. The method as claimed in claim 1, wherein said step of comparing and correlating comprises the step of providing a correlation map in relation to a user-visitor engagement quotient, in terms of each activity by a user, in terms of said pre-defined reference parameters and further comprises a step of generating a weighted score for each activity in relation to said correlation map based on said reference parameters.

10. The method as claimed in claim 9, wherein said step of recommending action points comprises a step of generating recommendations based on parameters and activities defined by an internal parameter creation and update mechanism, wherein the weighted score assigned to each activity by a data combination and interpretation mechanism and further comprises a step of pointing each recommendation to an active link on the page in order to allow the user to take instant action based on the weighted recommendation.

11. The method as claimed in claim 1, wherein said step of comparing and correlating comprises a step of creating pre-decided parameters in relation to activities that are carried out on the page in relation to a social media networking platform that hosts the page.

12. The method as claimed in claim 1, wherein said step of recommending action points comprises the steps of:
   ranking each page in relation to at least one pre-defined engagement formula; and
   ranking visitor engagement for each page.

13. The method as claimed in claim 1, wherein said step of recommending action points comprises the steps of:
   checking if each recommendation was acted upon;
   iterating said method steps after action on a recommendation, in order to generate new recommendation action points;
   providing a score for each page in terms of said pre-defined page data parameters; and
   generating a report for score improvement, based on said scores.

14. The method as claimed in claim 1, wherein said method comprises a step of parsing and processing language related to each activity on page in order to allow understanding of positive or negative connotation or influence of the page and its users, said method using Artificial Neural Networks, semantic analysis engines and databases, syntax analysis engines and databases to suitably rank a page in accordance with the parameters of natural language processing mechanism.

15. A system for automated recommendations for social media activities, said system comprising:
   page data extraction circuit adapted to extract pre-defined page data parameters in relation to pre-defined reference parameters;
   reference circuit adapted to provide reference parameters in relation to each of said pre-defined page data parameters;
   comparing and correlation circuit adapted to compare and correlate each of said extracted pre-defined page data parameters with each of said corresponding reference parameters to obtain a corresponding comparative and correlative score for each of said pre-defined page data parameters;
   recommendation circuit adapted to recommend action points based on each of said comparative and correlative scores for each of said pre-defined page data parameters and based on pre-defined system-defined parameters;
   the recommendation circuit recommending topics for a page in order to engage visitors, including:
   manually populating a database of topics;
   searching for relevant or latest topics based on content from a natural language processing mechanism;
   crawling the page to collect crawled topics from the page in relation to a categorization, data, and visitor inputs associated with the page;
   aggregating news items, feed data, current web activity, and real time web events from an internet in relation to each of said crawled topics; and
   correlating topics from said database, said crawled topics, and said aggregated information in order to display potentially pertinent topics to a user or a visitor of the page.

16. The system as claimed in claim 15, wherein said reference circuit comprises:
   a first database of categories;
   a first categorized reference store adapted to store said pre-defined reference parameters in relation to each category of the page;
   a second database comprising data in relation to every page for each categorized page and further comprising data in relation to user engagement for each activity; and
   a second categorized reference store adapted to store pre-defined reference parameters in relation to each category of the page based on a pre-defined number of selected pages.

17. The system as claimed in claim 16, wherein said comparing and correlation circuit comprises:
   a data combination and interpretation engine adapted to interpret correlation between activity on the page and visitor activity on the page; and
   a page activity analysis engine adapted to analyze activities of the user in relation to said first and second categorized reference stores and said pre-defined page data parameters.

18. The system as claimed in claim 17, wherein said recommendation circuit comprises a recommendation generation engine adapted to generate recommendations based on parameters and activities defined by an internal parameter creation and update engine, and a weighted score assigned to each activity by the data combination and interpretation engine and further comprising a pointer engine adapted to point each recommendation to an active link on the page in order to allow the user to take instant action based on the weighted recommendation, thereby absolving said recommendation.

19. The system as claimed in claim 16, wherein said comparing and correlation circuit comprises:
   a visitor activity analysis engine adapted to analyze activities of visitors in relation to said first and second categorized reference stores and said pre-defined page data parameters; and
   a correlation engine for correlating visitor activity with respect to page activity in order to obtain a correlation map in relation to said first categorized reference store, said second categorized reference store, and said pre-defined page data parameters.

20. The system as claimed in claim 16, wherein said comparing and correlation circuit includes a page activity analysis engine comprising:
   a page activity comparator circuit adapted to compare captured page statistics with data from the second database; and
   a visitor activity comparator circuit adapted to compare captured demographic statistics with data from the second database.

21. The system as claimed in claim 15, wherein said page data extraction circuit comprises:
   demographics capturing circuit adapted to capture demographics of visitors onto the page over a sampled duration of time such that said demographics capturing circuit is a continuous real-time monitoring and capturing; and
   page statistics capturing circuit adapted to capture pre-defined statistics of a page such that said page statistics capturing circuit is a continuous real-time monitoring and capturing.

22. The system as claimed in claim 15, wherein said comparing and correlation circuit comprises a correlation mapping engine adapted to provide a correlation map in relation to a user-visitor engagement quotient, in terms of each activity by the user, in terms of said pre-defined reference parameters and further includes a weight assigning engine adapted to generate a weighted score for each activity in relation to said correlation map based on said reference parameters.

23. A non-transitory computer readable medium containing executable code, for automated recommendations for social media activities, comprising:
   extracting pre-defined page data parameters in relation to pre-defined reference parameters;
   providing reference parameters in relation to each of said pre-defined page data parameters;
   comparing and correlating each of said extracted pre-defined page data parameters with each of said corresponding reference parameters to obtain a corresponding comparative and correlative score for each of said pre-defined page data parameters;
   recommending action points based on each of said comparative and correlative scores for each of said pre-defined page data parameters and based on pre-defined system-defined parameters;
   recommending topics for a page in order to engage visitors, including:
   manually populating a database of topics;
   searching for relevant or latest topics based on content from a natural language processing mechanism;
   crawling the page to collect crawled topics from the page in relation to a categorization, data, and visitor inputs associated with the page;

aggregating news items, feed data, current web activity, and real time web events from an internet in relation to each of said crawled topics; and correlating topics from said database, said crawled topics, and said aggregated information in order to display potentially pertinent topics to a user or a visitor of the page.

\* \* \* \* \*